US006502647B1

(12) United States Patent
Krzyzewski et al.

(10) Patent No.: US 6,502,647 B1
(45) Date of Patent: Jan. 7, 2003

(54) PNEUMATIC TOOL ASSEMBLY

(76) Inventors: Douglas C. Krzyzewski, 1157 Ardmore Hwy., Taft, TN (US) 38488; Joseph J. Krzyzewski, 24620 Union Hill Rd., Ardmore, TN (US) 38449

( * ) Notice: Subject to any disclaimer, the term of this patent is extended or adjusted under 35 U.S.C. 154(b) by 51 days.

(21) Appl. No.: 09/688,443

(22) Filed: Oct. 16, 2000

(51) Int. Cl.[7] .............................................. B23B 45/00
(52) U.S. Cl. ........................ 173/170; 173/168; 173/169
(58) Field of Search .......................... 173/48, 168, 169, 173/170, 217

(56) References Cited

U.S. PATENT DOCUMENTS

| | | | | |
|---|---|---|---|---|
| 4,643,263 A | | 2/1987 | Karden | 173/168 |
| 5,038,523 A | * | 8/1991 | Farber et al. | 15/1.7 |
| 5,044,568 A | | 9/1991 | Shigemizu | 241/169 |
| 5,065,476 A | * | 11/1991 | Dohse et al. | 16/422 |
| 5,201,146 A | * | 4/1993 | Fushiya | 451/358 |
| 5,339,572 A | * | 8/1994 | Eicher | 451/358 |
| 5,466,183 A | | 11/1995 | Kirn et al. | 451/359 |
| D377,303 S | | 1/1997 | Nagel | D8/68 |
| 5,681,214 A | | 10/1997 | Kleider et al. | 451/358 |
| 5,924,497 A | | 7/1999 | Spooner et al. | 173/169 |

* cited by examiner

*Primary Examiner*—Scott A. Smith
*Assistant Examiner*—Nathaniel Chukwurah
(74) *Attorney, Agent, or Firm*—Waddey & Patterson; Larry W. Brantley

(57) ABSTRACT

A pneumatic tool assembly is disclosed. The assembly includes a swivel backhead that is connected to a pneumatic tool using a retainer ring and two slip rings. One of the slip rings is placed between the swivel backhead and the pneumatic tool and allows the swivel backhead to rotate with respect to the pneumatic tool. The second slip ring is positioned between the swivel backhead and the retainer ring and allows the swivel backhead to rotate with respect to the retainer ring. An L-shaped handle is rotatably connected to the swivel backhead for use in holding and operating the pneumatic tool. A locking mechanism is connected to the handle and includes a hand retractable spring loaded plunger. The retainer ring includes a plurality of locking openings for receiving the plunger. The plunger is used to fix the swivel backhead at a desired position by inserting the plunger into one of the locking openings in the retainer ring.

9 Claims, 4 Drawing Sheets

PNEUMATIC TOOL ASSEMBLY

BACKGROUND OF THE INVENTION

The present invention relates generally to pneumatic tools. More particularly, this invention pertains to a pneumatic tool having a handle rotatably connected to the tool and including a locking mechanism for locking the handle in a desired position with respect to the tool.

Many tools, including pneumatic tools, currently used in various industries include handles that are rigidly connected to the housing of the tool. In many practical work situations where a person is using one of these tools, the location of the handle and the fact that the handle cannot be rotated with respect to the housing prevents the use of the tool. This fact has been recognized by people working with such tools and has resulted in the development of tools having handles rotatably connected to a tool housing.

For example, U.S. Pat. No. 5,466,183 issued to Kirn et al. on Nov. 14, 1995 for a "Hand Held Power Tool With Locking Rotatable Appendage" and U.S. Pat. No. 5,681,214 issued to Kleider et al. on Oct. 28, 1997 for a "Hand Power Tool" disclose a portable power tool having a handle that is rotatably connected to the housing of the power tool. According to the '183 and '214 patents, the handle may be fixed in three (3) different rotational positions relative to the housing of the power tool using three pairs of rib structures. The '183 and '214 patents do not disclose or suggest a structure that may be used to fix the handle in more than three (3) rotational positions. Furthermore, the use of pairs of rib structures to fix the position of the handle limits the overall number of positions in which the handle may be fixed. As a result, this tool limits the number of positions that the handle may be fixed in with respect to the tool housing.

Another patent, U.S. Pat. No. 5, 924,497 issued to Spooner et al. on July 20, 1999 for a "Power Hand Tool With Rotatable Handle," discloses a pneumatic tool having a handle rotatably connected to the tool housing. The '497 patent discloses a handle that is rotatably connected to a pneumatic tool housing using a ring, flange, and wavey spring configuration. The wavey spring forces the handle against the ring and the flange and thereby holds the handle in a fixed position relative to the housing. The '497 patent teaches that the spring should be chosen to provide enough force to hold the handle in a fixed position while working with the pneumatic tool, but be light enough that an operator may rotate the handle to any desired position.

Although at first glance the '497 patent seems to provide a solution to the limitation of the '183 and '214 patents discussed above, the tool disclosed in the '497 patent exchanges one disadvantage for another. Specifically, there are situations in which the forces applied to the handle as a result of using a tool connected to the handle may exceed the force provided by the spring to hold the handle in place. In such a situation, the handle would unexpectedly move from its desired position. As a result, a person using the tool may be unable to complete their work or, in more serious situations, the person may be injured when the handle unexpectedly rotates. Thus, although the '497 patent does disclose a handle than may be fixed in a greater number of positions than the tool disclosed in the '183 and '214 patents, the '497 patent does not disclose a structure or method for securing locking the handle in a desired position.

In still other cases, some tools do not have a handle and simply include a pneumatic control lever for controlling the tool that is rigidly connected to the tool body. For example, one pneumatic tool manufactured by the inventor of the present invention includes a thumb actuated control lever rigidly attached to the left side of the tool body. The tool is designed to be used by an operator by gripping the tool body with the right hand and activating the control lever using the thumb of the operator's right hand. As a result, this tool is more conveniently used by an operator who is right-handed. In addition, this tool, and all pneumatic tools having a control lever rigidly attached to the tool body for that matter, cannot be used in situations where the location of the control lever prevents the use of the tool.

Accordingly, there is a need for pneumatic tool assembly that includes a handle and control lever rotatably connected to the tool housing, while at the same time, providing a means for securely fixing the handle in a large number of desired positions with respect to the tool housing.

SUMMARY OF THE INVENTION

One object of the present invention is to provide a pneumatic tool having a handle and control lever rotatably connected to the tool housing.

Another object is to provide a locking mechanism for locking the handle in multiple positions with respect to the tool housing.

A further object is to provide a pneumatic tool that includes a handle that may be used by an operator that is right-handed or left-handed.

To satisfy these objectives, the present invention includes a swivel backhead connected to a handle and a retainer ring for connecting the swivel backhead to a pneumatic tool. Rotation of the swivel backhead with respect to the pneumatic tool is facilitated by placing a first slip ring in between the swivel backhead and the pneumatic tool. Rotation of the swivel backhead with respect to the retainer ring is facilitated by placing a second slip ring between the swivel backhead and the retainer ring. A locking mechanism, which includes a hand retractable spring loaded plunger that is connected to a swivel lock bracket, is used to fix the swivel backhead, and as a result the handle that is connected to the swivel backhead, at a desired position with respect to the pneumatic tool. Finally, a pneumatic control assembly is connected to the handle and the swivel backhead and operable to control the pneumatic tool.

DESCRIPTION OF THE PREFERRED EMBODIMENTS

Figure 1:
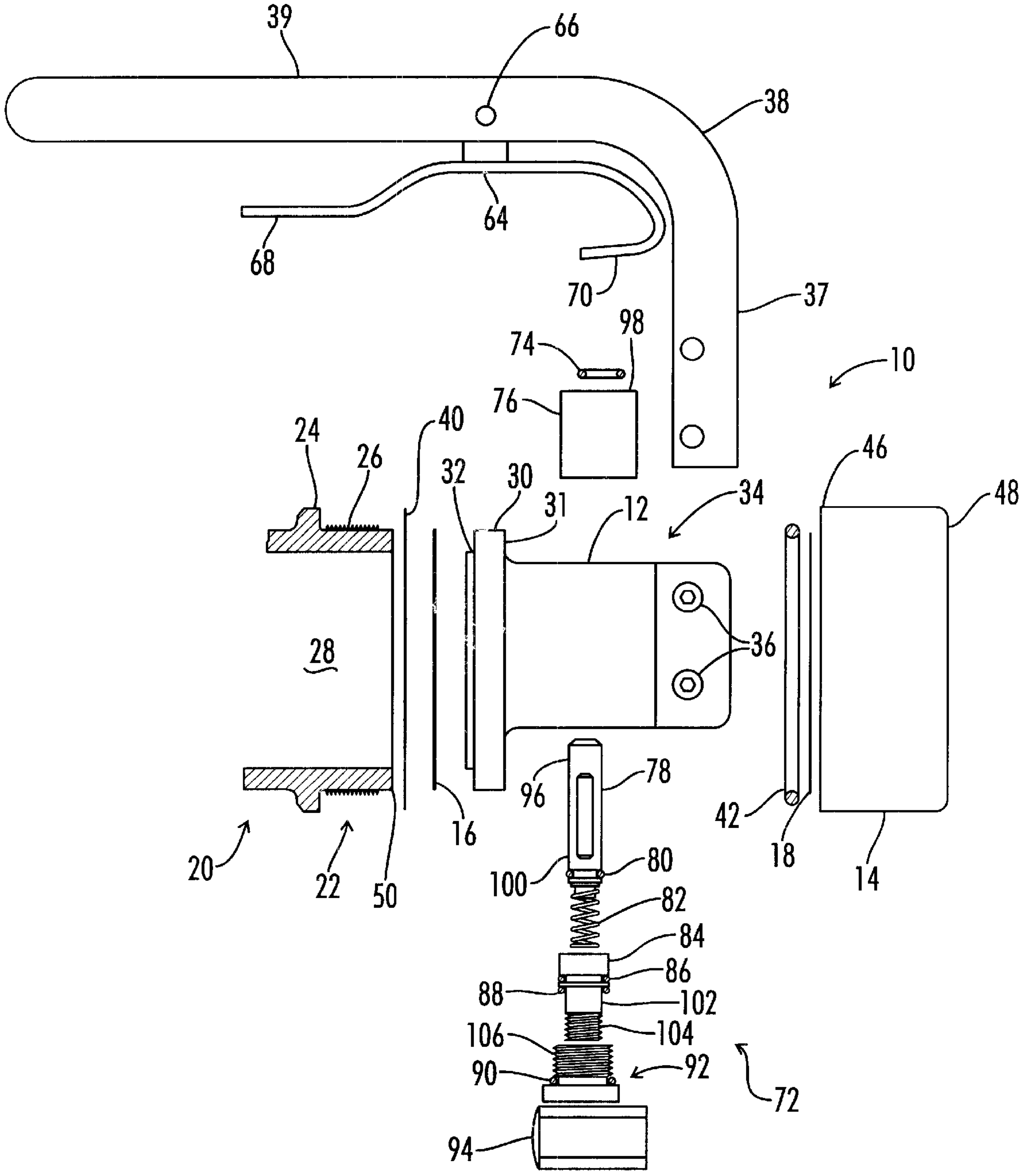
FIG. 1 is an exploded side view of one embodiment of the present invention.

Referring to FIG. 1, one embodiment of the present invention of a pneumatic tool assembly (or apparatus) 10 includes a swivel backhead 12, a retainer ring 14, a first slip ring 16, and a second slip ring 18.

FIG. 1 also includes a cut-away view of a portion (also referred to as the tool body) of a pneumatic riveter tool 20 to which the pneumatic tool assembly 10 is connected. The pneumatic riveter tool 20 includes a threaded lip portion 22, a shoulder (or flange) 24, threads 26, an interior cavity 28, and an annular body end face 50. In general, the combination of the threaded lip portion 22, shoulder 24, threads 26, and annular body end face 50 is referred to as a back end portion or rear end portion of the tool 20.

The swivel backhead 12 includes an annular portion 30 having annular flanges, 31 and 32, and further includes a backhead body 34 extending away from the annular flange 31. Backhead body 34 includes mounting holes 36, which are used to connect a handle 38 to swivel backhead 12, and a passageway (not shown) between the annular portion 30 and the mounting holes 36. Note that the handle 38 is connected after the retainer ring 14 has been connected to the pneumatic tool 20 as described below.

Figure 4:
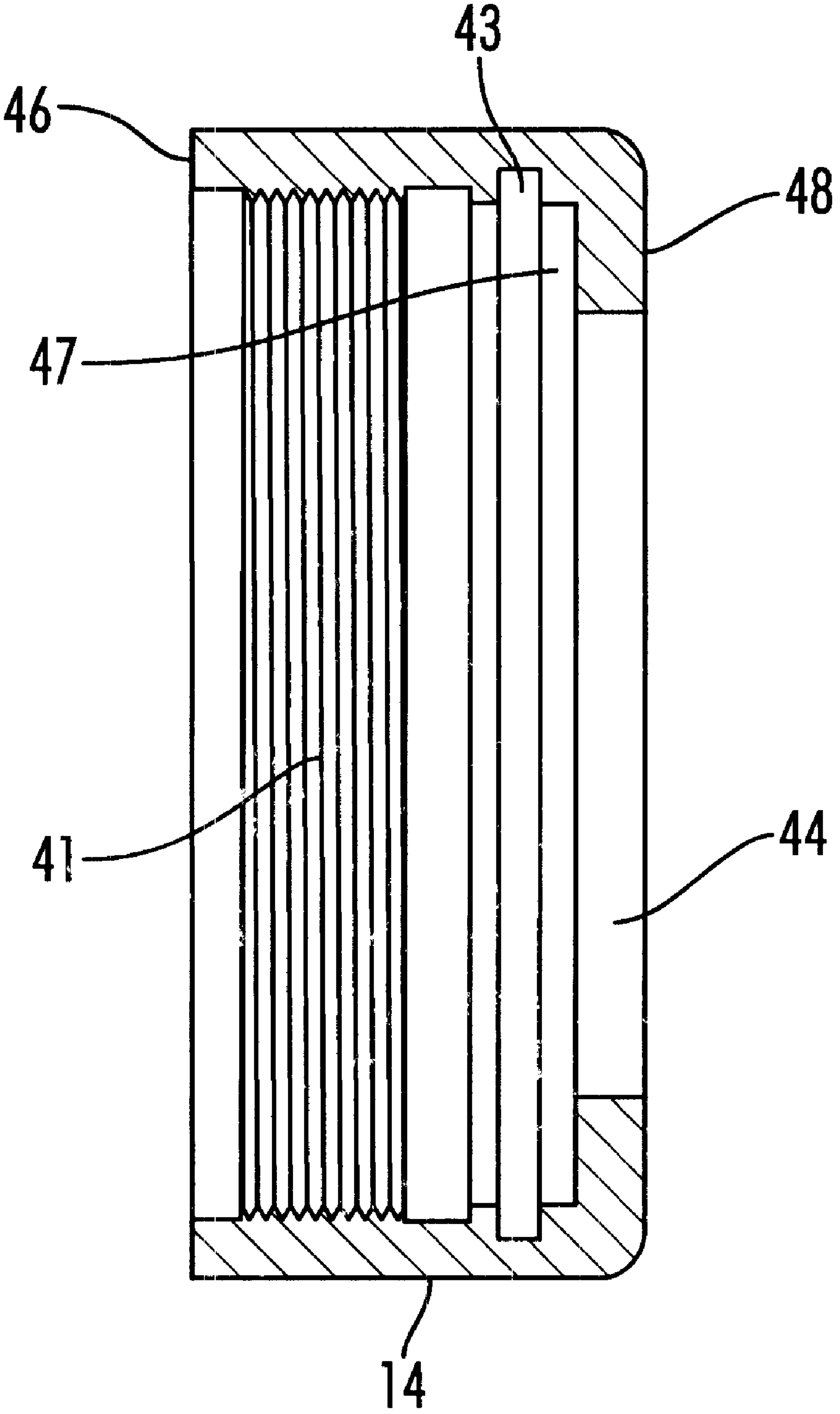
FIG. 4 is a side view of one embodiment of the retainer ring of the present invention.

The pneumatic tool assembly 10 may be assembled in the following manner. First, a gasket 40 is passed over the threaded portion 22 of the pneumatic tool 20 into contact with the shoulder 24 of the pneumatic tool 20. The second slip ring 18 is positioned against flange 47 (shown in FIG. 4) of retainer ring 14 and an o-ring 42 is inserted into groove 43 (FIG. 4) of retainer ring 14.

The backhead body 34 of the swivel backhead 12 is passed through opening 44 (FIG. 4) of retainer ring 14 with annular portion 30 passing partially through o-ring 42 and annular flange 31 contacting slip ring 18. The first slip ring 16 is then inserted onto annular portion 30 of backhead body 34 of swivel backhead 12.

Finally, retainer ring 14 includes an interior threaded surface (FIG. 4) and is screwed onto the threaded portion 22 of pneumatic tool 20.

When assembled, the front edge (also referred to as an outer ring face) 46 of retainer ring 14 is pressed against gasket 40, which is in turn pressed against the shoulder 24 of the pneumatic tool 20. In addition, the inside flange 47 (FIG. 4) of the retainer ring 14 is pressed against the second slip ring 18, the second slip ring 18 is pressed against annular flange 31 and o-ring 42 is in contact with annular portion 30. As a result, the annular portion 30 of swivel backhead 12 is pressed against the first slip ring 16, which is in turn pressed against the annular body end face 50 of the pneumatic tool 20.

When the handle 38 is used to rotate the swivel backhead 12, the first slip ring 16 allows the swivel backhead 12 to rotate 360 degrees with respect to the pneumatic tool 20 and the second slip ring 18 allows the swivel backhead 12 to rotate 360 degrees with respect to the retainer ring 14.

The handle 38 is designed to make it easier for a user to hold and balance the pneumatic tool 20. As such, the handle 38 is L-shaped and is positioned so that a longer portion (or second leg) 39 of the handle 38 points toward the pneumatic tool 20 and a shorter portion (first leg) 37 is used to connect the handle 38 to the swivel backhead 12 (See FIG. 1). Using this type of handle design allows the user to use his/her dominant hand, whether that is his/her left or right hand, on the handle, while supporting the front of the pneumatic tool 20 using his/her other hand. As a result, the user can more evenly distribute the weight of the pneumatic tool 20.

Figure 2:
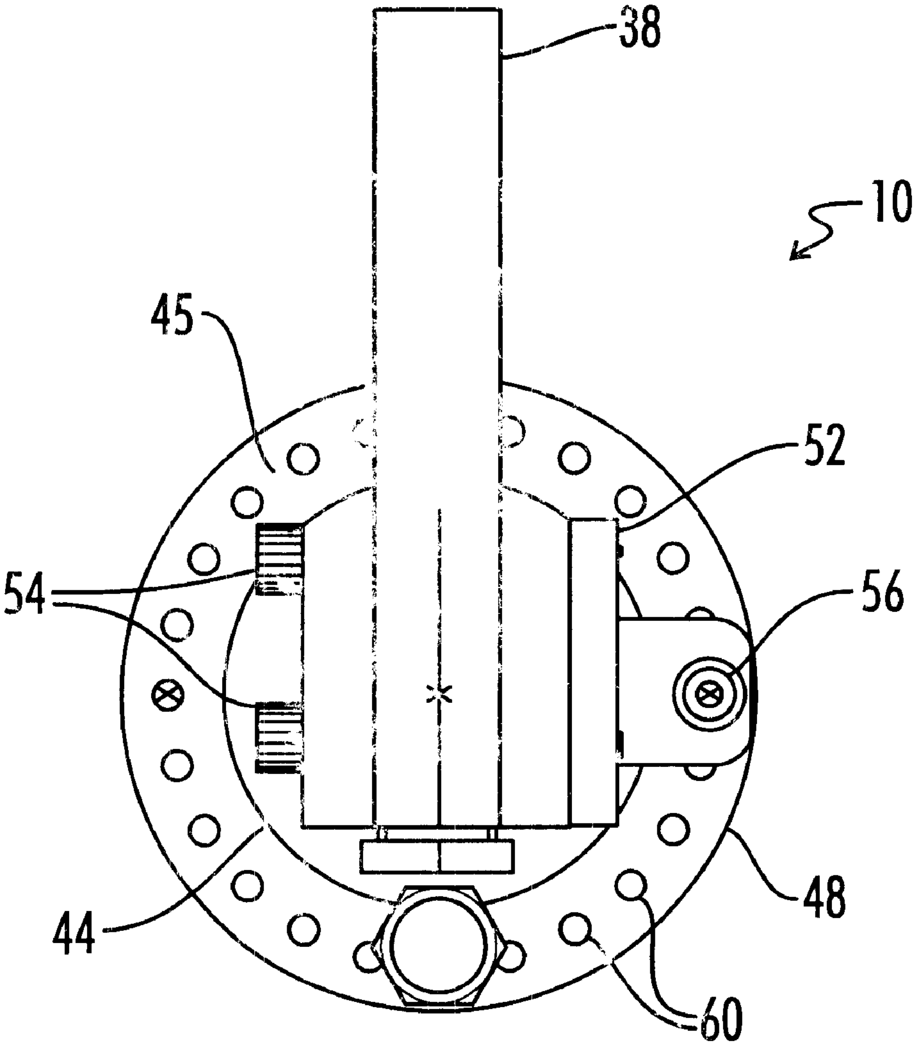
FIG. 2 is a back view of an assembled embodiment of the present invention.
Figure 3:
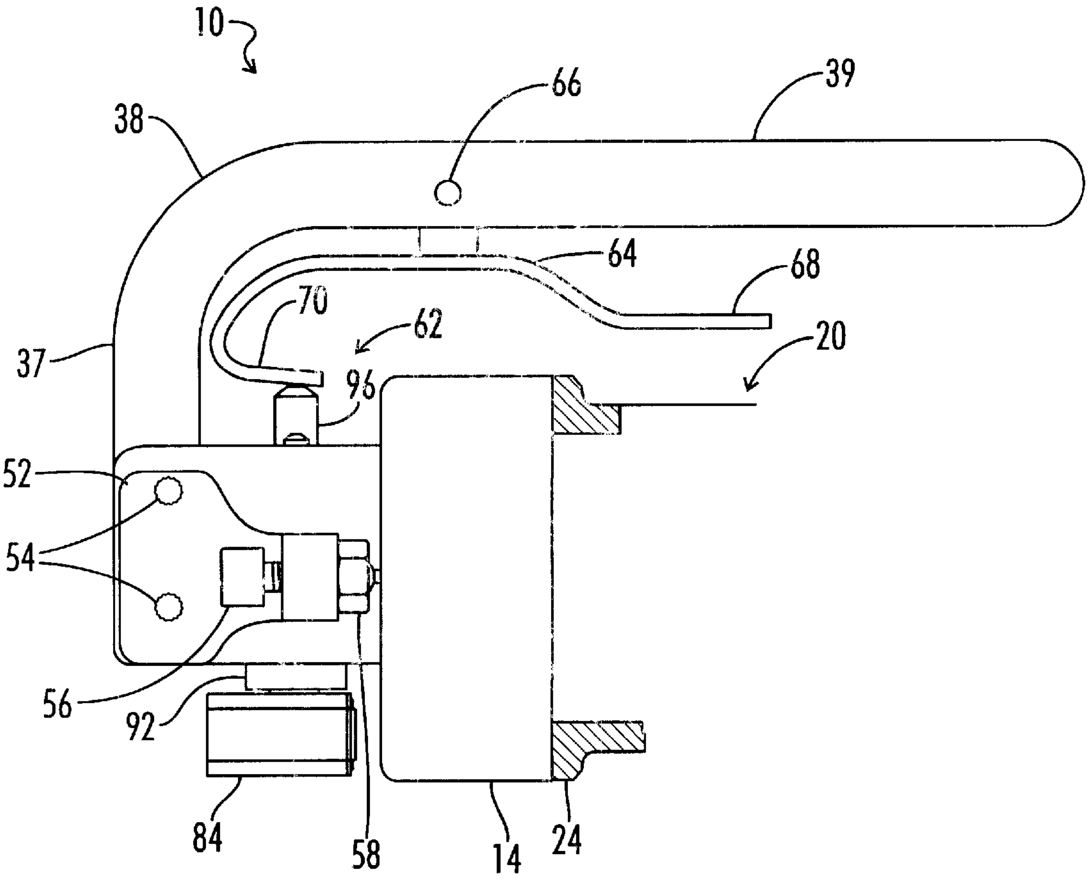
FIG. 3 is a side view of an assembled embodiment of the present invention.

Referring to FIGS. 2 and 3, a swivel lock bracket 52 is connected to the swivel backhead 12 using the mounting holes 36 and conventional screws 54. Note that conventional screws 54 may be used to connect the handle 38 to one side of the swivel backhead 12 and to connect the swivel lock bracket 52 to the opposite side of the swivel backhead 12.

Swivel lock bracket 52 includes a threaded hole (not shown) for receiving a hand retractable spring loaded plunger 56 (commercially available) which is locked in place with a nut 58. In one embodiment the hand retractable spring loaded plunger 56 is one of the types of plungers manufactured by Carr Lane Manufacturing Co., located at 4200 Carr Lane Court, St. Louis, Mo. 63119 and having telephone number (314) 647-6200.

Retainer ring 14 includes a number of locking openings (or recesses) 60 on the surface of the back edge 48 (also referred to as an annular ring end face) (See FIG. 2) for fixing the swivel backhead 12 at a desired position. In a preferred embodiment, the retainer ring 14 includes 24 locking openings, which allows the swivel backhead 12 to be locked at fifteen (15) degree increments. The swivel backhead 12 may be fixed at a desired position as follows. First, the swivel backhead 12 is released by pulling back on the knurled knob of the hand retractable plunger 56 and rotating the knob 90° from its original position, thereby locking the plunger 56 in a disengaged position. The swivel backhead 12 can then be rotated to a desired position and the locking mechanism engaged by rotating the knurled knob 90° back to its original position, thereby allowing the spring pressure to push the plunger forward into one of the recesses 60 on the surface of the back edge 48 of the retainer ring 14. The combination of the retainer ring 14, swivel lock bracket 52, hand retractable spring loaded plunger 56, and nut 58 may be more generally referred to as a multi-position releasable locking mechanism or a locking pin assembly.

Referring to FIGS. 1 and 3, the pneumatic tool assembly 10 of the present invention further includes a pneumatic control assembly 62 connected to the handle 38 and the swivel backhead 12 for controlling the pneumatic tool 20. The control assembly 62 includes a control lever (or trigger) 64 pivotally connected to the underside of the handle 38 using a pivoting pin 66. The control lever 64 includes a flat portion 68 and a curved portion 70. When the flat portion is pushed toward the handle 38, the control lever 64 pivots on the pivoting pin 66 and the curved portion 70 moves downward toward the swivel backhead 12.

The control assembly 62 further includes a valve assembly 72 connected to the swivel backhead 12 using the opening in the swivel backhead 12 located between the annular portion 30 and the mounting holes 36. The valve assembly 72 includes an o-ring 74, a valve bushing 76, a pneumatic control valve 78, an o-ring 80, a spring 82, a swivel 84, three additional o-rings, 86, 88, and 90, a swivel nut 92, and an elbow 94. The valve 78 is connected to the valve bushing 76 and o-ring 74 so that a portion 96 of the valve 78 extends beyond an upper portion 98 of the valve bushing 76 and swivel backhead 12 (See FIG. 3). A lower portion 100 of the valve 78 is passed through o-ring 80 and is connected to the spring 82, which is in turn connected to the swivel 84.

The swivel 84 includes a smooth portion 102 and a threaded portion 104. The swivel 84 is passed through the swivel nut 92 and is connected to the elbow 94 using the threaded portion 104. The swivel nut 92 includes a threaded portion 106 that is used to connect the swivel nut 92 to the swivel backhead 12. The smooth portion 102 allows the valve assembly 72 to rotate with respect to the swivel assembly 12 and the three additional 0-rings 86, 88, and 90, prevent compressed air from escaping the valve assembly 72. The elbow 94 is connected to an air supply (not shown) commonly used for pneumatic tools.

As shown in FIG. 3, the control lever 64 should be connected to the handle 38 so that the curved portion 70 of throttle control level 64 is placed close to the upper portion 96 of valve 78. When a person using the pneumatic tool 20 grabs the handle 38 and presses down on the flat portion 68 of the control lever 64, the curved portion 70 presses down on the upper portion 96 of the valve 78 and thereby activates the pneumatic tool 20. When the flat portion 68 is released, the spring 82 pushes the valve 78 and the curved portion 70 back up. As a result, the pneumatic tool 20 is deactivated. In addition, since the control lever 64 is positioned under the handle 38, the pneumatic tool 20 is less likely to be accidentally activated when the pneumatic tool 20 rolls over on a flat surface such as a bench.

Various modifications made by made to the embodiments disclosed above. For example, the number of locking openings 60 may be increased or decreased to suit the needs of the user.

Thus, although there have been described particular embodiments of the present invention of a new and useful "Pneumatic Tool Assembly," it is not intended that such references be construed as limitations upon the scope of this invention except as set forth in the following claims.

The invention claimed is:

1. A pneumatic tool apparatus, comprising:

a tool body having an annular body end face and having an interior cavity;

a swivel backhead having an annular flange complementary to the annular body end face and having a backhead body extending from the annular flange away from the tool body, the swivel backhead having a passageway therethrough in communication with the interior cavity of the tool body, and the annular flange defining a swivel axis;

a retainer ring connected to the tool body and having a radially inward extending flange with an opening defined therethrough, the backhead body extending through the opening with the annular flange of the swivel backhead being held loosely enough between the annular body end face and the retainer flange so that the swivel backhead can rotate about the swivel axis;

a handle attached to the backhead body;

a pneumatic control valve mounted in the passageway of the swivel backhead for controlling flow of air therethrough; and a multi-position releasable locking mechanism for selectively locking the swivel backhead and handle in one of a plurality of rotational positions about the swivel axis relative to the tool body.

2. The apparatus of claim 1, wherein:

the handle is L-shaped having a first leg attached to the backhead body and extending radially outward therefrom, and having a second leg extending toward the tool body generally parallel to the swivel axis.

3. The apparatus of claim 2, further comprising:

a trigger mounted on an underside of the second leg of the handle so that the trigger can be squeezed by an operator's hand holding the handle from above, the trigger being operably engaged with the control value for operating the control valve.

4. The apparatus of claim 2, wherein the second leg of the handle extends forward over the tool body a sufficient distance that the tool will suspend balanced from the handle with the swivel axis generally horizontal when the tool handle is gripped from above on the forward portion of the second leg of the handle.

5. The apparatus of claim 1, wherein the locking mechanism comprises:

the retainer ring having an annular ring end face with a plurality of locking recesses defined therein and spaced radially about the annular ring end face; and a releasable locking protrusion attached to the backhead body for rotation therewith, the releasable locking protrusion being engageable with any one of the locking recesses of the retainer ring.

6. The apparatus of claim 5, wherein the plurality of locking recesses includes at least one recess every 15 degrees about the annular ring end face.

7. The apparatus of claim 5, wherein the releasable locking protrusion includes a hand retractable spring loaded plunger.

8. The apparatus of claim 1, wherein:

the tool body has an external cylindrical threaded surface adjacent the annular body end face, and a radially outward extending body flange located axially inward from the threaded surface; and the retainer ring has an inner cylindrical threaded surface mated with the external threaded surface of the tool body, and the retainer ring has an axially inner ring end face abutting the radially outward extending body flange to limit the threaded engagement of the retainer ring with the tool body.

9. The apparatus of claim 8, further comprising:

a first slip ring sandwiched between the annular body end face of the tool body and the annular flange of the swivel backhead; and a second slip ring sandwiched between the annular flange of the swivel backhead and the retainer flange of the retainer ring.

* * * * *